United States Patent
Petersson et al.

(10) Patent No.: US 12,126,421 B2
(45) Date of Patent: Oct. 22, 2024

(54) BEAM MANAGEMENT PROCEDURES FOR NETWORK NODES AND TERMINAL DEVICES

(71) Applicant: Telefonaktiebolaget LM Ericsson (publ), Stockholm (SE)

(72) Inventors: Sven Petersson, Sävedalen (SE); Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 97 days.

(21) Appl. No.: 17/916,392

(22) PCT Filed: Mar. 30, 2020

(86) PCT No.: PCT/EP2020/059009
§ 371 (c)(1),
(2) Date: Sep. 30, 2022

(87) PCT Pub. No.: WO2021/197576
PCT Pub. Date: Oct. 7, 2021

(65) Prior Publication Data
US 2023/0146269 A1  May 11, 2023

(51) Int. Cl.
*H04B 7/10* (2017.01)
*H04B 7/06* (2006.01)
*H04B 7/08* (2006.01)

(52) U.S. Cl.
CPC ............. *H04B 7/10* (2013.01); *H04B 7/0628* (2013.01); *H04B 7/088* (2013.01)

(58) Field of Classification Search
CPC ........ H04B 7/10; H04B 7/0628; H04B 7/088; H04B 7/063; H04B 7/0695; H04B 7/0469
See application file for complete search history.

(56) References Cited

U.S. PATENT DOCUMENTS

2018/0145807 A1* 5/2018 Nagata ................ H04B 7/088
2020/0084788 A1* 3/2020 Li ........................ H04L 5/0053

FOREIGN PATENT DOCUMENTS

| AU | 2017300666 A1 | 2/2019 | |
| CA | 2981136 C * | 10/2023 | ............... H04B 7/04 |
| WO | 2018017920 A1 | 1/2018 | |

OTHER PUBLICATIONS

International Search Report and the Written Opinion of the International Searching Authority, issued in corresponding International Application No. PCT/EP2020/059009, dated Oct. 27, 2020, 13 pages.

(Continued)

*Primary Examiner* — Jean B Corrielus
(74) *Attorney, Agent, or Firm* — Rothwell, Figg, Ernst & Manbeck, P.C.

(57) ABSTRACT

There is provided mechanisms for performing a beam management procedure. A method is performed by a network node. The method comprises obtaining configuration information from a terminal device for which the network node provides network access. The configuration information specifies that the terminal device is in need for evaluating different polarization states in different time units during the beam management procedure. The method comprises performing the beam management procedure with the terminal device. The beam management procedure involves the network node to, per slot, transmit reference signals according to a reference signal transmission scheme. The reference signal transmission scheme depends on the obtained configuration information.

22 Claims, 7 Drawing Sheets

---

S102
Obtain configuration information from terminal device

S104
Perform beam management procedure with terminal device according to configuration information (56) References Cited

OTHER PUBLICATIONS

Qualcomm, Jan. 22, 2019, Fierce Wireless "Breaking the wireless barriers to mobilize 5G NR mmWave" retrieved from www.qualcomm.com, 40 pages.

* cited by examiner

BEAM MANAGEMENT PROCEDURES FOR NETWORK NODES AND TERMINAL DEVICES

CROSS REFERENCE TO RELATED APPLICATION(S)

This application is a 35 U.S.C. § 371 National Phase Entry Application from PCT/EP2020/059009, filed Mar. 30, 2020, designating the United States, the disclosure of which is incorporated herein by reference in its entirety.

TECHNICAL FIELD

Embodiments presented herein relate to methods, a network node, a terminal device, computer programs, and a computer program product for performing a beam management procedure.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). A BPL (i.e. both the beam used by the network node and the beam used by the terminal device) is expected to be discovered and monitored by the network using measurements on downlink reference signals, such as channel state information reference signals (CSI-RS) or synchronization signal block (SSB) signals, used for beam management.

A beam management procedure can be used for discovery and maintenance of beam pair links. In some aspects, the beam management procedure is defined in terms of a P-1 sub-procedure, a P-2 sub-procedure, and a P-3 sub-procedure.

The CSI-RS for beam management can be transmitted periodically, semi-persistently or aperiodically (event triggered) and they can be either shared between multiple terminal devices or be device-specific. The SSB are transmitted periodically and are shared for all terminal devices. In order for the terminal device to find a suitable network node beam, the network node, during the P-1 sub-procedure, transmits the reference signal in different transmission (TX) beams on which the terminal device performs measurements, such as reference signal received power (RSRP), and reports back the N best TX beams (where N can be configured by the network). Furthermore, the transmission of the reference signal on a given TX beam can be repeated to allow the terminal device to evaluate a suitable reception (RX) beam. Reference signals that are shared between all terminal devices served by the TRP might be used to determine a first coarse direction for the terminal devices. It could be suitable for such a periodic TX beam sweep at the TRP to use SSB as the reference signal. One reason for this is that SSB are anyway transmitted periodically (for initial access/synchronization purposes) and SSBs are also expected to be beamformed at higher frequencies to overcome the higher propagation losses noted above.

A finer beam sweep in more narrow beams than used during the P-1 sub-procedure might then be performed at the network node during a P-2 sub-procedure to determine a more detailed direction for each terminal device. Here, the CSI-RS might be used as reference signal. As for the P-1 sub-procedure, the terminal device performs measurements, such as reference signal received power (RSRP), and reports back the N best TX beams (where N can be configured by the network).

Furthermore, the CSI-RS transmission in the transmission beam selected during the P-2 sub-procedure can be repeated in a P-3 sub-procedure to allow the terminal device to evaluate suitable RX beams at the terminal device.

However, in some aspects, which beam in the respective beam management sub-processes is reported and/or selected by a terminal device as the best beam (e.g., in terms of RSRP) to some extent depends on the antenna architecture at the terminal device. Such aspects are not considered during current beam management procedures.

Hence, there is still a need for improved beam management procedures.

SUMMARY

An object of embodiments herein is to provide beam management procedures that take into account the antenna architecture at the terminal device.

According to a first aspect there is presented a method for performing a beam management procedure. The method is performed by a network node. The method comprises obtaining configuration information from a terminal device for which the network node provides network access. The configuration information specifies that the terminal device is in need for evaluating different polarization states in different time units during the beam management procedure. The method comprises performing the beam management procedure with the terminal device. The beam management procedure involves the network node to, per slot, transmit reference signals according to a reference signal transmission scheme. The reference signal transmission scheme depends on the obtained configuration information.

According to a second aspect there is presented a network node for performing a beam management procedure. The network node comprises processing circuitry. The processing circuitry is configured to cause the network node to obtain configuration information from a terminal device for which the network node provides network access. The configuration information specifies that the terminal device is in need for evaluating different polarization states in different time units during the beam management procedure. The processing circuitry is configured to cause the network node to perform the beam management procedure with the terminal device. The beam management procedure involves the network node to, per slot, transmit reference signals according to a reference signal transmission scheme. The reference signal transmission scheme depends on the obtained configuration information.

According to a third aspect there is presented a network node for performing a beam management procedure. The network node comprises an obtain module configured to obtain configuration information from a terminal device for which the network node provides network access. The configuration information specifies that the terminal device is in need for evaluating different polarization states in different time units during the beam management procedure. The network node comprises a beam management module configured to perform the beam management procedure with the terminal device. The beam management procedure involves the network node to, per slot, transmit reference signals according to a reference signal transmission scheme. The reference signal transmission scheme depends on the obtained configuration information.

According to a fourth aspect there is presented a computer program for performing a beam management procedure. The computer program comprises computer program code which, when run on processing circuitry of a network node, causes the network node to perform a method according to the first aspect.

According to a fifth aspect there is presented a method for performing a beam management procedure. The method is performed by a terminal device. The method comprises providing configuration information to a network node that provides network access to the terminal device. The configuration information specifies that the terminal device is in need for evaluating different polarization states in different time units during the beam management procedure. The method comprises performing the beam management procedure with the network node. The beam management procedure involves the terminal device to, per slot, receive reference signals from the network node according to a reference signal reception scheme. The reference signal reception scheme depends on the provided configuration information.

According to a sixth aspect there is presented a terminal device for performing a beam management procedure. The terminal device comprises processing circuitry. The processing circuitry is configured to cause the terminal device to provide configuration information to a network node that provides network access to the terminal device. The configuration information specifies that the terminal device is in need for evaluating different polarization states in different time units during the beam management procedure. The processing circuitry is configured to cause the terminal device to perform the beam management procedure with the network node. The beam management procedure involves the terminal device to, per slot, receive reference signals from the network node according to a reference signal reception scheme. The reference signal reception scheme depends on the provided configuration information.

According to a seventh aspect there is presented a terminal device for performing a beam management procedure. The terminal device comprises a provide module configured to provide configuration information to a network node that provides network access to the terminal device. The configuration information specifies that the terminal device is in need for evaluating different polarization states in different time units during the beam management procedure. The terminal device comprises a beam management module configured to perform the beam management procedure with the network node. The beam management procedure involves the terminal device to, per slot, receive reference signals from the network node according to a reference signal reception scheme. The reference signal reception scheme depends on the provided configuration information.

According to an eighth aspect there is presented a computer program for performing a beam management procedure, the computer program comprising computer program code which, when run on processing circuitry of a terminal device, causes the terminal device to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these aspects enable the beam management procedures to take into account the antenna architecture at the terminal device.

Advantageously, these aspects improve the beam management procedure.

Advantageously, these aspects improve the beam management procedure by enabling improvement in the beam selection at the terminal device.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
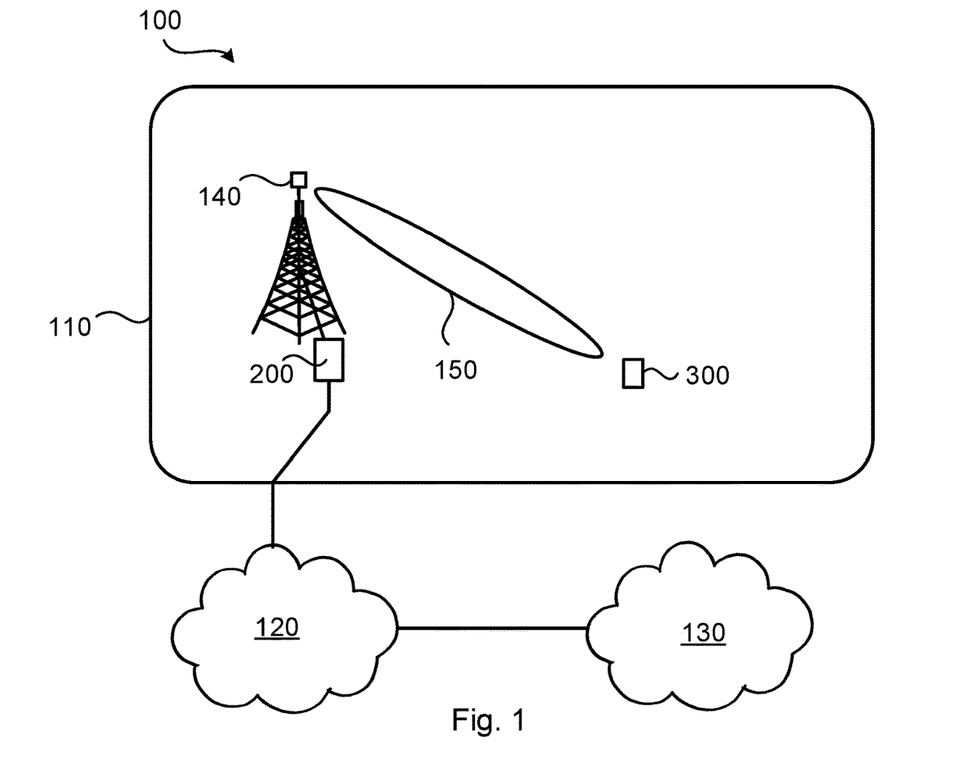
FIG. 1 is a schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, a fifth generation (5G) telecommunications network, or any evolvement thereof, and support any 3GPP telecommunications standard, where applicable.

The communication network 100 comprises a network node 200 configured to provide network access to terminal devices, as represented by terminal device 300, in a radio access network 110. The radio access network 110 is operatively connected to a core network 120. The core network 120 is in turn operatively connected to a service network 130, such as the Internet. The terminal device 300 is thereby enabled to, via the network node 200, access services of, and exchange data with, the service network 130.

The network node 200 comprises, is collocated with, is integrated with, or is in operational communications with, a transmission and reception point (TRP) 150. The network node 200 (via its TRP 140) and the terminal device 300 is configured to communicate with each other in beams, one of which is illustrated at reference numeral 150. In this respect, beams that could be used both as TX beams and RX beams will hereinafter simply be referred to as beams.

Examples of network node 200 are radio access network nodes, radio base stations, base transceiver stations, Node Bs, evolved Node Bs, g NBs, access points, access nodes, and backhaul nodes. Examples of terminal devices 300 are wireless devices, mobile stations, mobile phones, handsets, wireless local loop phones, user equipment (UE), smartphones, laptop computers, tablet computers, network equipped sensors, network equipped vehicles, and so-called Internet of Things devices.

There could be different types of antenna arrangements that the terminal device 300 is provided with in order for the terminal device 300 to efficiently communicate with the TRP 140. In this respect, an antenna panel might be defined as a rectangular antenna array of dual-polarized antenna elements with typically one transmit/receive unit (TXRU) per polarization. An analog distribution network with phase shifters can be used to steer a directional beam as generated at each such antenna panel. Alternatively, the terminal device 300 is configured for digital wideband (time domain beamformed) beamforming that mimics the operation and function of the analog distribution network. Multiple antenna panels might be stacked next to each other and digital beamforming can be performed across the antenna panels. For the terminal device 300, depending on its physical orientation, signals might arrive and emanate from all different directions. Hence, it might be beneficial to have an antenna implementation at the terminal device 300 which is enabled to generate omni-directional-like coverage for the terminal device 300 in addition to high gain narrow directional beams. One way to increase the omni-directional coverage at the terminal device 300 is to provide the terminal device 300 with multiple antenna panels, where at least two of the antenna panels have different pointing directions.

Figure 2:
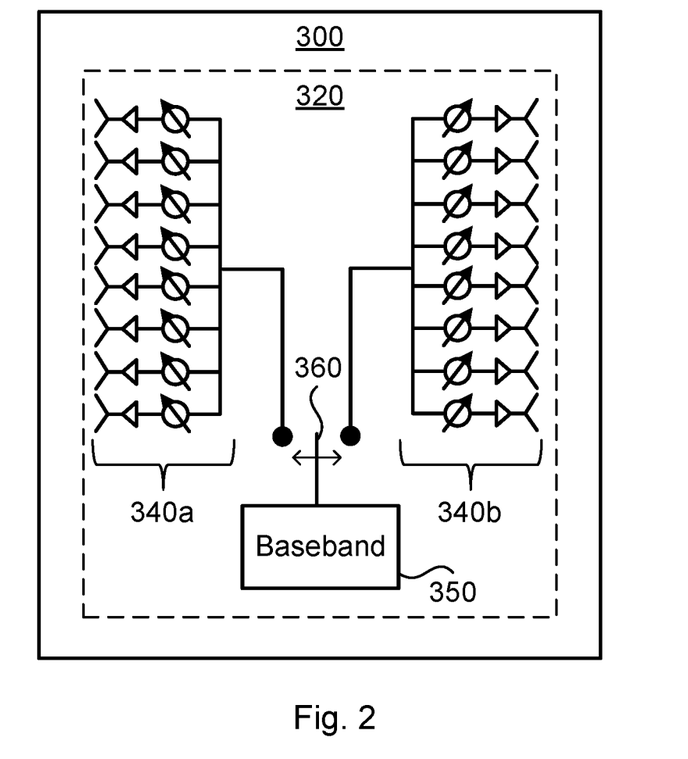
FIG. 2 schematically illustrates the antenna architecture of a terminal device according to an embodiment.

FIG. 2 schematically illustrates an example antenna architecture of the terminal device 300. According to the illustrated antenna architecture, the terminal device 300 is equipped with at least one antenna array 340a, 340b. Each antenna array 340a, 340b has dual-polarized antenna elements. In the illustrated example, each antenna array 340a, 340b has eight dual-polarized antenna elements but as the skilled person understands, each antenna array 340a, 340b might have less than eight dual-polarized antenna elements or more than eight dual-polarized antenna elements. The antenna arrays 340a, 340b are connectable to a baseband chain 350 in the terminal device 300 (via a switch 360). In some examples the terminal device 300 is equipped with more than one antenna array 340a, 340b. Then the two or more antenna arrays 340a, 340b could selectively be connected to one and the same baseband chain 350, one at a time. This enables the terminal device 300 to comprise just one single baseband chain 350 despite comprising two or more antenna arrays 340a, 340b. In other examples, the terminal device 300 comprises two or more baseband chains 350, where each baseband chain 350 is connectable to one or more antenna arrays 340a, 340b. This enables each antenna array 340a, 340b to have its own baseband chain 350. The antenna architecture might be part of a communications interface 320 of the terminal device 300. Thus, in some embodiments, the terminal device 300 is equipped with an antenna array 340a, 340b having dual-polarized antenna elements, where the antenna array 340a, 340b is connected to a baseband chain 350 in the terminal device 300.

Figure 3:
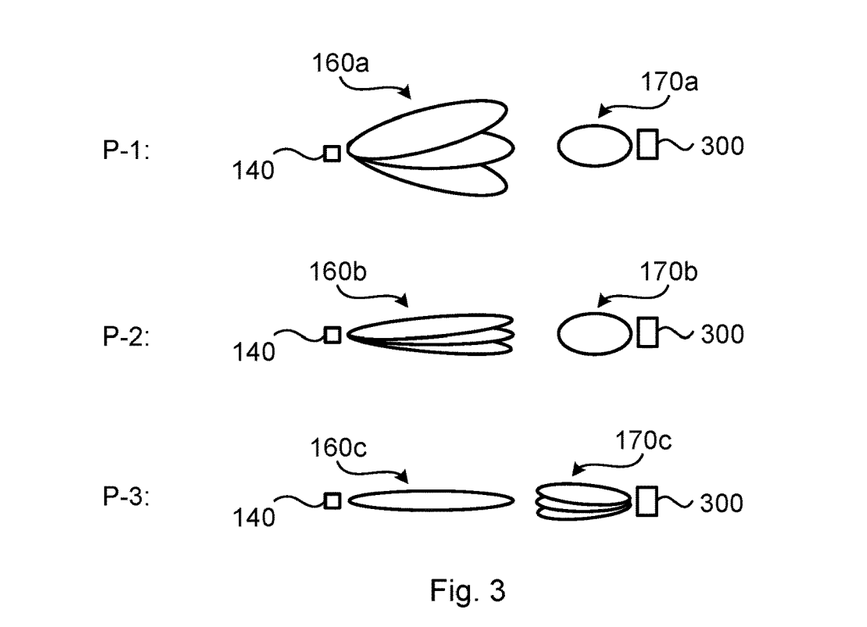
FIG. 3 schematically illustrates a beam management procedure according to embodiments.

As disclosed above there is still a need for improved beam management procedures. Reference is therefore made to FIG. 3 that schematically illustrates a beam management procedure consisting of three sub-procedures, referred to as P-1, P-2, and P-3 sub-procedures. These three sub-procedures will now be disclosed in more detail.

One main purpose of the P-1 sub-procedure is for the network node 200 to find a coarse direction towards the terminal device 300 by transmitting reference signals in wide, but narrower than sector, beams that are swept over the whole angular sector. The TRP 140 is expected to, for the P-1 sub-procedure, utilize beams, according to a spatial beam pattern 160a, with rather large beam widths. During the P-1 sub-procedure, the reference signals are typically transmitted periodically and are shared between all terminal devices 300 served by the network node 200 in the radio access network 110. The terminal device 300 uses a wide, or even omni-directional beam for receiving the reference signals during the P-1 sub-procedure, according to a spatial beam pattern 170a. The reference signals might be periodically transmitted CSI-RS (or, formally, CSI-RS resources) or SSB. The terminal device 300 might then to the network node 200 report the $N \geq 1$ best beams and their corresponding quality values, such as reference signal received power (RSRP) values. The beam reporting from the terminal device 300 to the network node 200 might be performed rather seldom (in order to save overhead) and can be either periodic, semi-persistent or aperiodic.

One main purpose of the P-2 sub-procedure is to refine the beam selection at the TRP 140 by the network node 200 transmitting reference signals whilst performing a new beam sweep with more narrow directional beams, according to a spatial beam pattern 160b, than those beams used during the P-1 sub-procedure, where the new beam sweep is performed around the coarse direction, or beam, reported during the P-1 sub-procedure. During the P-2 sub-procedure, the terminal device 300 typically uses the same beam as during the P-1 sub-procedure, according to a spatial beam pattern 170b. The terminal device 300 might then to the network node 200 report the N≥1 best beams and their corresponding quality values, such as reference signal received power (RSRP) values. One P-2 sub-procedure might be performed per each terminal device 300 or per each group of terminal devices 300. The reference signals might be aperiodically or semi-persistently transmitted CSI-RS (or, formally, CSI-RS resources). The P-2 sub-procedure might be performed more frequently than the P-1 sub-procedure in order to track movements of the terminal device 300 and/or changes in the radio propagation environment.

One main purpose of the P-3 sub-procedure is for terminal devices 300 utilizing analog beamforming, or digital wideband (time domain beamformed) beamforming, to find best beam. During the P-3 sub-procedure, the reference signals are transmitted, according to a spatial beam pattern 160c, in the best reported beam of the P-2 sub-procedure whilst the terminal device 300 performs a beam sweep, according to a spatial beam pattern 170c. The P-3 sub-procedure might be performed at least as frequently as the P-2 sub-procedure in order to enable the terminal device 300 to compensate for blocking, and/or rotation.

Due to the physical radio environment, which is reported as the best beam might be different for different polarizations. For example, for some non-line of sight (NLOS) radio propagation environments, what is reported as the strongest beam in one polarization might correspond to the weakest beam in the orthogonal polarization. One way to mitigate this is to switch the polarization of the beams at the TRP 140 between transmission of consecutive SSB. However, such switching might create problems for automatic gain control (AGC) as performed by the terminal device 300. On reason for this is due to that the received power of the two reference signals transmitted for the two orthogonal polarizations might differ too much, for example more than 10 dB.

One alternative way for the terminal device 300 to find its best beam, instead of using a P-3 sub-procedure is for the terminal device 300 to evaluate different beams during the periodic SSB transmission after initial network access. Since each SSB consists of four orthogonal frequency-division multiplexing (OFDM) symbols, a maximum of four beams can be evaluated during each SSB burst transmission. One benefit with this is that no extra overhead of CSI-RS transmission is needed. One drawback, however, with determining the beam to use at the terminal device 300 based on SSB transmission is that an SSB only has one TRP port, and hence only is transmitted over one polarization (per each unique direction), which implies that the terminal device 300 might only be able to evaluate suitable beams for one polarization. But as disclosed above, in case the RSRP differs significantly for different polarizations there is a risk that a non-optimal beam is selected at the terminal device 300.

The embodiments disclosed herein therefore relate to mechanisms for performing a beam management procedure. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a terminal device 300, a method performed by the terminal device 300, and a computer program product comprising code, for example in the form of a computer program, that when run on processing circuitry of the terminal device 300, causes the terminal device 300 to perform the method.

Figure 4:
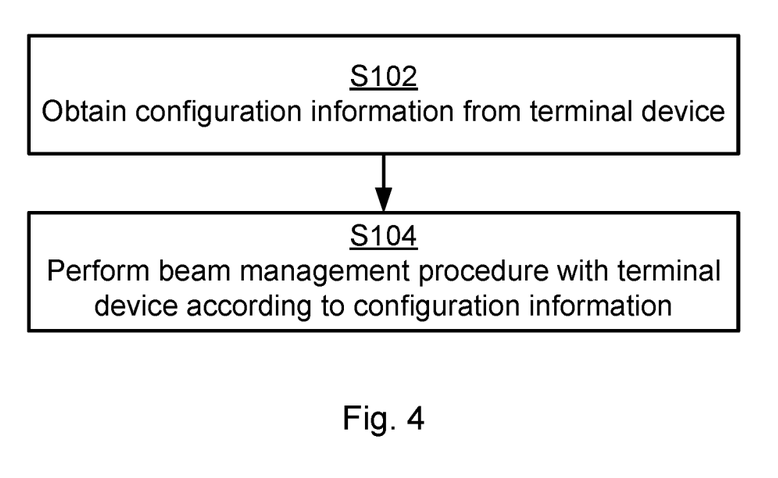
FIGS. 4 and 5 are flowcharts of methods according to embodiments.

Reference is now made to FIG. 4 illustrating a method for performing a beam management procedure as performed by the network node 200 according to an embodiment.

The network node 200 is to perform a beam management procedure that is dependent on information of the terminal device 200. Hence, the network node 200 is configured to perform step S102:

S102: The network node 200 obtains configuration information from a terminal device 300 for which the network node 200 provides network access. The configuration information specifies that the terminal device 300 is in need for evaluating different polarization states in different time units during the beam management procedure.

The obtained information is then used when the beam management procedure is performed. In particular, the network node 200 is configured to perform step S104:

S104: The network node 200 performs the beam management procedure with the terminal device 300. The beam management procedure involves the network node 200 to, per slot, transmit reference signals according to a reference signal transmission scheme. The reference signal transmission scheme depends on the obtained configuration information.

Embodiments relating to further details of performing a beam management procedure as performed by the network node 200 will now be disclosed.

Each reference signal might correspond to a respective CSI-RS resource or SSB.

There could be different types of reference signal transmission schemes. In some aspects, the reference signal transmission scheme defines where in the slot the reference signals are to be transmitted. In particular, in some embodiments where each of the different time units corresponds to a respective OFDM symbol, the reference signal transmission scheme defines at which OFDM symbols per slot that the reference signals are to be transmitted.

Embodiments according to which the amount of reference signals to be transmitted can be adapted according to the configuration information will now be disclosed. In some aspects, these embodiments can be readily combined with the above described P-2 sub-procedure. Further aspects relating thereto are also disclosed below with reference to FIG. 6.

In some aspects, the total number of reference signals to be transmitted per slot is equal to twice the number of beams in which the reference signals are to be transmitted at the TRP 140. That is, according to an embodiment, according to the beam management procedure, the reference signals are to be transmitted in beams, and, according to the reference signal transmission scheme, each reference signal is to be transmitted twice in each beam per slot.

The above embodiments enable the terminal device 300 to, during a beam sweep of a P-2 sub-procedure, measure the RSRP for each beam for both polarizations at the terminal device 300. This can be achieved by, at the TRP 140, transmitting CSI-RS resources twice in each beam.

Embodiments according to which positions in the slot where the reference signals are placed can be adapted according to the configuration information will now be disclosed. In some aspects, these embodiments can be readily combined with the above described P-3 sub-procedure. Further aspects relating thereto are also disclosed below with reference to FIG. 7.

In some aspects, the terminal device 300 is configured to uses N>1 beams per polarization. Therefore, in some embodiments, the configuration information further specifies that the terminal device 300 is configured to generate N>1 beams per polarization of the antenna elements. However, this does not imply that the terminal device 300 actually is to generate all N beams during the beam management procedure, only that the terminal device 300 is configured to generate these beams.

In some aspects, the number of reference signals that are to be transmitted per slot as part of the beam management procedure depends on the value of N. In particular, in some embodiments, how many reference signals that are to be transmitted per slot depends on the value of N. In this respect, according to a first example, the total number of reference signals to be transmitted per slot as part of the beam management procedure is less than 2·N. That is, in some embodiments, according to the reference signal transmission scheme, fewer reference signals than 2·N are to be transmitted per slot. According to a second example, the total number of reference signals to be transmitted per slot as part of the beam management procedure is equal to N+2. That is, in some embodiments, according to the reference signal transmission scheme, exactly N+2 reference signals are to be transmitted per slot.

In some aspects, two of the reference signals are in the slot separated in time from the remaining reference signals. That is, in some embodiments, according to the reference signal transmission scheme, two of the reference signals are in the slot separated by at least one OFDM symbol from the remaining N reference signals, and these two of the reference signals are to be transmitted before the remaining N reference signals.

There could be different ways to in the slot separate these two of the reference signals in time from the remaining reference signals. In some aspects, two reference signals are placed first in the slot and the remaining reference signals are placed last in the same slot. That is, in some embodiments, according to the reference signal transmission scheme, two of the reference signals are placed to be transmitted as early as possible in the slot, and the remaining N reference signals are placed to be transmitted as late as possible in the same slot.

In some aspects, all reference signals are transmitted using the same beam. That is, in some embodiments, all the reference signals per slot are to be transmitted using one and the same beam (as generated at the TRP 140).

The above embodiments enable the terminal device 300 to, during a beam sweep of a P-3 sub-procedure, first evaluate the preferred polarization, and then evaluate a preferred narrow beam for the preferred polarization. This can be achieved by, at the network node 200, adapt the positions in the slot where the CSI-RS resources are transmitted.

Figure 5:
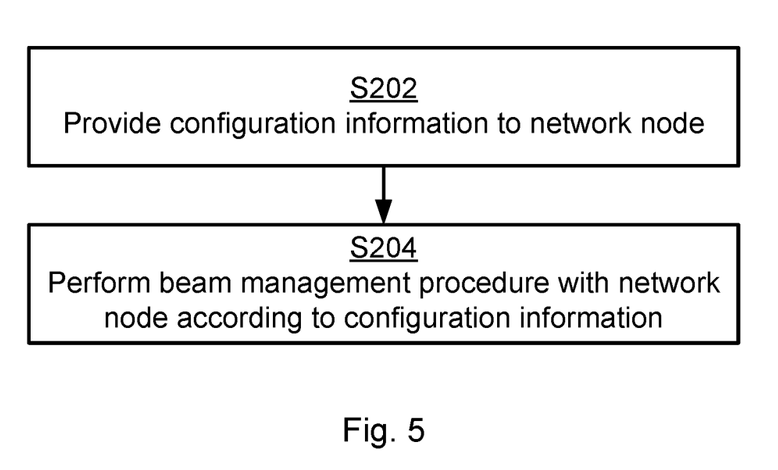

Reference is now made to FIG. 5 illustrating a method for performing a beam management procedure as performed by the terminal device 300 according to an embodiment.

As disclosed above, the network node 200 is to perform a beam management procedure that is dependent on information of the terminal device 200. Hence, the terminal device 300 is configured to perform step S202:

S202: The terminal device 300 provides configuration information to the network node 200 that provides network access to the terminal device 300. The configuration information specifies that the terminal device 300 is in need for evaluating different polarization states in different time units during the beam management procedure.

The provided information is then used when the beam management procedure is performed. In particular, the terminal device 300 is configured to perform step S204:

S204: The terminal device performs the beam management procedure with the network node 200. The beam management procedure involves the terminal device 300 to, per slot, receive reference signals from the network node 200 according to a reference signal reception scheme. The reference signal reception scheme depends on the provided configuration information.

Although the reference signal reception scheme might be regarded as dictated based on information received from the network node 200, the reference signal reception scheme itself is not necessarily signaled to the terminal device 300 from the network node 200. Rather, the reference signal reception scheme is defined by the way the terminal device 300 operates.

Embodiments relating to further details of performing a beam management procedure as performed by the terminal device 300 will now be disclosed.

There could be different types of reference signal reception schemes. In some aspects, the reference signal reception scheme defines where in the slot the reference signals are to be received. In particular, in some embodiments where each of the different time units corresponds to a respective OFDM symbol, the reference signal reception scheme defines at which OFDM symbols per slot that the reference signals are to be received.

Embodiments according to which the amount of reference signals to be transmitted, and thus be received by the terminal device 300, can be adapted according to the configuration information will now be disclosed. In some aspects, these embodiments can be readily combined with the above described P-2 sub-procedure. Further aspects relating thereto are also disclosed below with reference to FIG. 6.

As disclosed above, in some aspects, the total number of reference signals to be transmitted per slot is equal to twice the number of beams in which the reference signals are to be transmitted at the TRP 140. Therefore, half of the reference signals might be received in each polarization. That is, in some embodiments, when performing the beam management procedure, half of the reference signals are received using a first polarization whereas the remaining half of the reference signals are received using a second polarization. Further, as disclosed above, according to the beam management procedure, the reference signals might be transmitted in beams. Then, according to the reference signal reception scheme, each reference signal per beam and per slot might be received once using the first polarization and once using the second polarization. Further in this respect, the terminal device 300 might be notified about which reference signals are transmitted in the same beam and which reference signals are transmitted in different beams.

The above embodiments enable the terminal device 300 to, during a beam sweep of a P-2 sub-procedure, measure the RSRP for each beam for both polarizations at the terminal device 300.

Embodiments according to which positions in the slot where the reference signals are placed can be adapted according to the configuration information will now be disclosed. In some aspects, these embodiments can be readily combined with the above described P-3 sub-procedure. Further aspects relating thereto are also disclosed below with reference to FIG. 7.

As disclosed above, in some embodiments, the configuration information further specifies that the terminal device 300 is configured to generate N>1 beams per polarization of the antenna elements.

As disclosed above, in some embodiments, how many reference signals that are to be received per slot depends on N.

As disclosed above, according to a first example, the total number of reference signals to be transmitted per slot as part of the beam management procedure is less than 2·N. Therefore, in some embodiments, according to the reference signal reception scheme, fewer reference signals than 2·N are to be received per slot. As further disclosed above, according to a second example, the total number of reference signals to be transmitted per slot as part of the beam management procedure is equal to N+2. Therefore, in some embodiments, according to the reference signal reception scheme, exactly N+2 reference signals are to be received per slot.

As disclosed above, two of the reference signals might in the slot be separated in time from the remaining reference signals. Therefore, in some embodiments, according to the reference signal reception scheme, two of the reference signals are in the slot separated by at least one OFDM symbol from the remaining N reference signals, and these two of the reference signals are to be received before the remaining N reference signals.

As disclosed above, two reference signals might be placed first in the slot and the remaining reference signals might be placed last in the same slot. Therefore, in some embodiments, according to the reference signal reception scheme, two of the reference signals are placed to be received as early as possible in the slot, and wherein said remaining N reference signals are placed to be received as late as possible in the slot.

Figure 7:
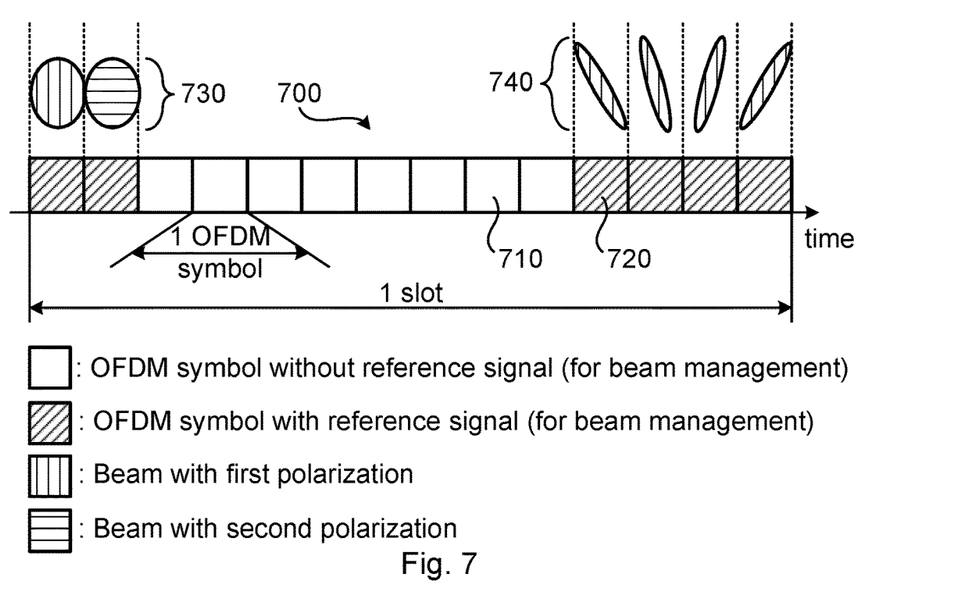

In some aspects, the terminal device 300 first evaluates the preferred polarization and then uses best polarization when receiving the remaining reference signals. When evaluating the preferred polarization, the terminal device 300 might use a comparatively wider beam, or beams, than the beam, or beams, used for receiving the remaining reference signals. This is also illustrated in FIG. 7 as referred to below. In particular, in some embodiments, when performing the beam management procedure, RSRP of a first of the two of the reference signals as received using a first polarization is compared to RSRP of a second of the two of the reference signals as received using a second polarization, and wherein the remaining N reference signals are received using that polarization (of the first polarization and the second polarization) yielding highest RSRP.

The above embodiments enable the terminal device 300 to, during a beam sweep of a P-3 sub-procedure, first evaluate the preferred polarization, and then evaluate a preferred narrow beam for the preferred polarization.

One example of how some of the herein disclosed embodiments can be readily combined with the above described P-2 sub-procedure will now be disclosed.

Figure 6:
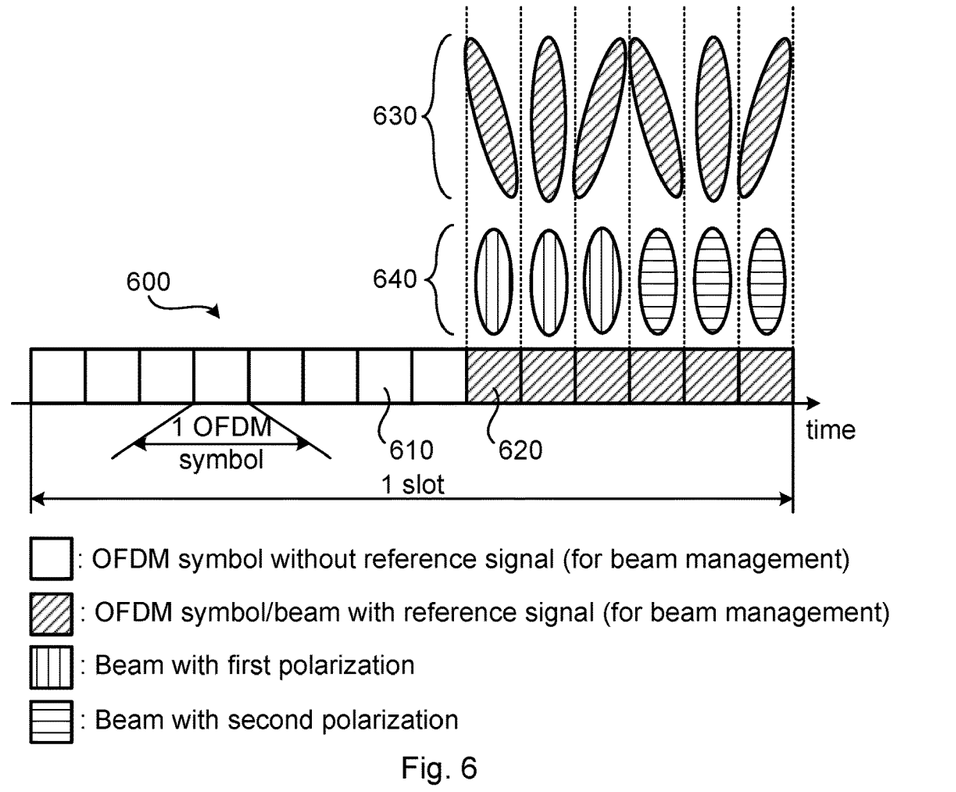
FIGS. 6 and 7 are schematic illustrations of transmission of reference signals in OFDM symbols of a slot according to embodiments.

Since the network node 200 obtains configuration information from the terminal device 300 where the configuration information specifies that the terminal device 300 is in need for evaluating different polarization states in different time units during the beam management procedure, the network node 200 might schedule a P-2 sub-procedure according to which a beam sweep is performed such that the terminal device 300 can evaluate reference signals transmitted in each beam for both the first polarization and the second polarizations at the terminal device 300. This can be achieved for example, by the network node 200 scheduling transmission of the reference signals in the beams by repeating a CSI-RS resource transmission in each beam two times. This enables the reference signals transmitted in each beam to, by the terminal device 300, be received using first the first polarization and then the second polarization, or vice versa. This is schematically illustrated in FIG. 6. In further detail, FIG. 6 illustrates transmission of reference signals in OFDM symbols of a slot 600 as well as the beams 630 used by the TRP 140 to transmit the reference signals and the beams 640 used by the terminal device 300 to receive the reference signals. The slot boo is made up of 14 OFDM symbols 610, 620. The six last OFDM symbols, one of which is identified at reference numeral 620, contain CSI-RS resources (for beam management), whereas the remaining OFDM symbols, one of which is identified at reference numeral 610, do not contain any CSI-RS resources (for beam management). According to the examples of FIG. 6, the terminal device 300 is enabled to evaluate three different beams in which reference signals are sent. The reference signals are transmitted twice per each beam such that each of the three beams can be evaluated in each of the first polarization and the second polarization at the terminal device 300. This will improve the beam selection at the TRP 140 due to reduced risk of polarization mismatching.

One example of how some of the herein disclosed embodiments can be readily combined with the above described P-3 sub-procedure will now be disclosed.

Since the network node 200 obtains configuration information from the terminal device 300 where the configuration information specifies that the terminal device 300 is in need for evaluating different polarization states in different time units during the beam management procedure, the network node 200 might schedule a P-3 sub-procedure according to which the terminal device 303 is enabled to first evaluate the preferred polarization state, and then perform a beam sweep for the preferred polarization state. This is schematically illustrated in FIG. 7. In further detail, FIG. 7 illustrates transmission of reference signals in OFDM symbols of a slot 700 as well as the beams 730, 740 used by the terminal device 300 to receive the reference signals.

The slot 700 is made up of 14 OFDM symbols 710, 720. The two first OFDM symbols and the four last OFDM symbols, one of which is identified at reference numeral 720, contain CSI-RS resources (for beam management), whereas the remaining OFDM symbols, one of which is identified at reference numeral 710, do not contain any CSI-RS resources (for beam management). For reception of the first two CSI-RS resources, the terminal device 300 generates two wide beams 730 of mutually orthogonal polarizations (defined by the first polarization and the second polarization). Based on RSRP measurements of the first two CSI-RS resources the terminal device 300 determines which polarization that is preferred. In the illustrative example of FIG. 7 it is assumed that the first polarization yielded highest RSRP and thus represents the preferred polarization. The terminal device 300 when receiving the last four OFDM symbols containing CSI-RS resources sweeps through four narrow beams 740 in the preferred polarization.

Figure 8:
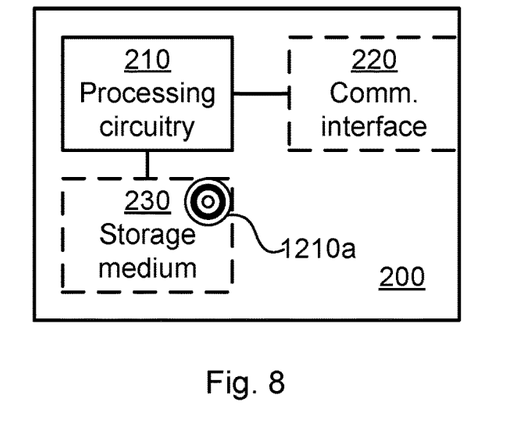
FIG. 8 is a schematic diagram showing functional units of a network node according to an embodiment.

FIG. 8 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210a (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, functions, nodes, and devices of the communication network 100 as well as entities, functions, nodes, and devices operatively connected to, or served, by, the communication network 100. As such the communications interface 220 may comprise one or more transmitters and receivers, comprising analogue and digital components.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 9:
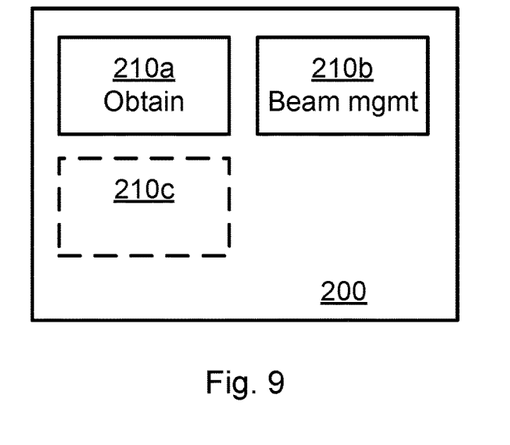
FIG. 9 is a schematic diagram showing functional modules of a network node according to an embodiment.

FIG. 9 schematically illustrates, in terms of a number of functional modules, the components of a network node 200 according to an embodiment. The network node 200 of FIG. 9 comprises a number of functional modules; an obtain module 210a configured to perform step S102, and a beam management module 210b configured to perform step S104. The network node 200 of FIG. 9 may further comprise a number of optional functional modules, such represented by functional module 210c. In general terms, each functional module 210a-210c may be implemented in hardware or in software. Preferably, one or more or all functional modules 210a-210c may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210c and to execute these instructions, thereby performing any steps of the network node 200 as disclosed herein.

The network node 200 may be provided as a standalone device or as a part of at least one further device. For example, the network node 200 may be provided in a node of the radio access network 110 or in a node of the core network 120. Alternatively, functionality of the network node 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time. In this respect, at least part of the network node 200 may reside in the radio access network, such as in the radio access network node, for cases when embodiments as disclosed herein are performed in real time.

Thus, a first portion of the instructions performed by the network node 200 may be executed in a first device, and a second portion of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 8 the processing circuitry 210 may be distributed among a plurality of devices, or nodes. The same applies to the functional modules 210a-210c of FIG. 9 and the computer program 1220a of FIG. 12.

Figure 10:
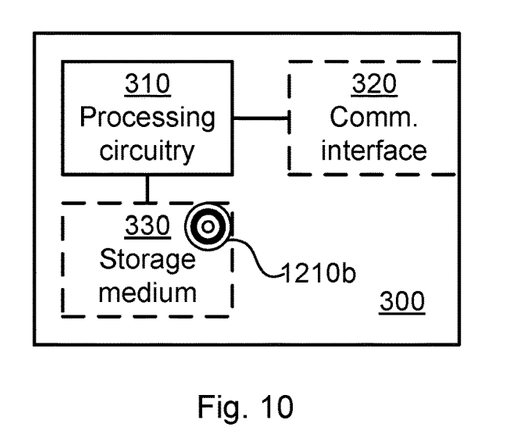
FIG. 10 is a schematic diagram showing functional units of a terminal device according to an embodiment.

FIG. 10 schematically illustrates, in terms of a number of functional units, the components of a terminal device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210b (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the terminal device 300 to perform a set of operations, or steps, as disclosed above. For example, the storage medium 330 may store the set of operations, and the processing circuitry 310 may be configured to retrieve the set of operations from the storage medium 330 to cause the terminal device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The terminal device 300 may further comprise a communications interface 320 for communications at least with the network node 200 via the TRP 140. As such the communications interface 320 may comprise one or more transmitters and receivers, comprising analogue and digital components. In this respect, the communications interface 320 might comprise, or be operatively connected to, an antenna architecture as described above with reference to FIG. 2.

The processing circuitry 310 controls the general operation of the terminal device 300 e.g. by sending data and control signals to the communications interface 320 and the storage medium 330, by receiving data and reports from the communications interface 320, and by retrieving data and instructions from the storage medium 330. Other components, as well as the related functionality, of the terminal device 300 are omitted in order not to obscure the concepts presented herein.

Figure 11:
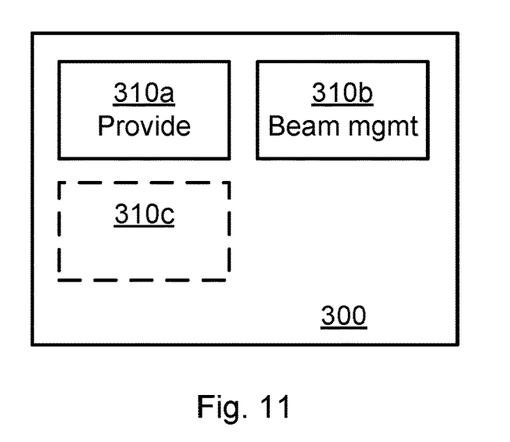
FIG. 11 is a schematic diagram showing functional modules of a terminal device according to an embodiment.

FIG. 11 schematically illustrates, in terms of a number of functional modules, the components of a terminal device 300 according to an embodiment. The terminal device 300 of FIG. 11 comprises a number of functional modules; a provide module 310a configured to perform step S202, and a beam management module 310b configured to perform step S204. The terminal device 300 of FIG. 11 may further comprise a number of optional functional modules, as represented by functional module 310c. In general terms, each functional module 310a-310c may be implemented in hardware or in software. Preferably, one or more or all functional modules 310a-310c may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310c and to execute these instructions, thereby performing any steps of the terminal device 300 as disclosed herein.

Figure 12:
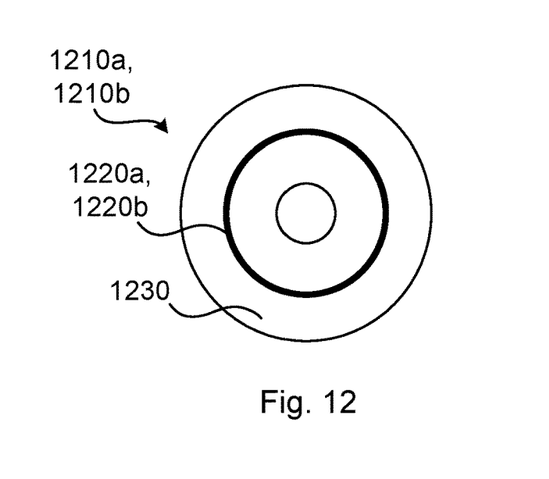
FIG. 12 shows one example of a computer program product comprising computer readable means according to an embodiment.

FIG. 12 shows one example of a computer program product 1210a, 1210b comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any steps of the network node 200 as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the terminal device 300 as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

Figure 13:
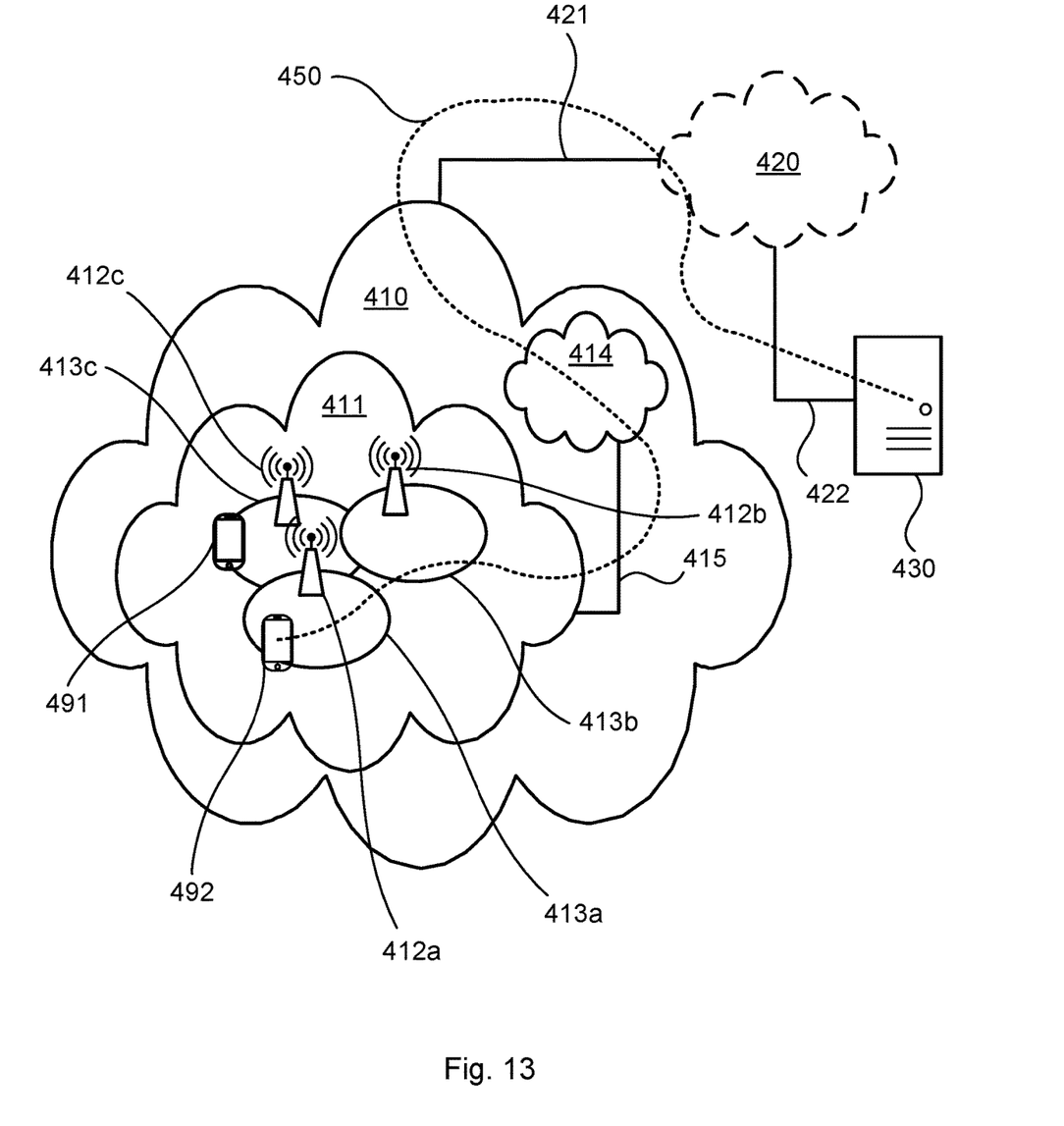
FIG. 13 is a schematic diagram illustrating a telecommunication network connected via an intermediate network to a host computer in accordance with some embodiments.

FIG. 13 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network no in FIG. 1, and core network 414, such as core network 120 in FIG. 1. Access network 411 comprises a plurality of radio access network nodes 412a, 412b, 412c, such as NBs, eNBs, gNBs (each corresponding to the network node 200 of FIG. 1) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal device 300 of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 13 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 14:
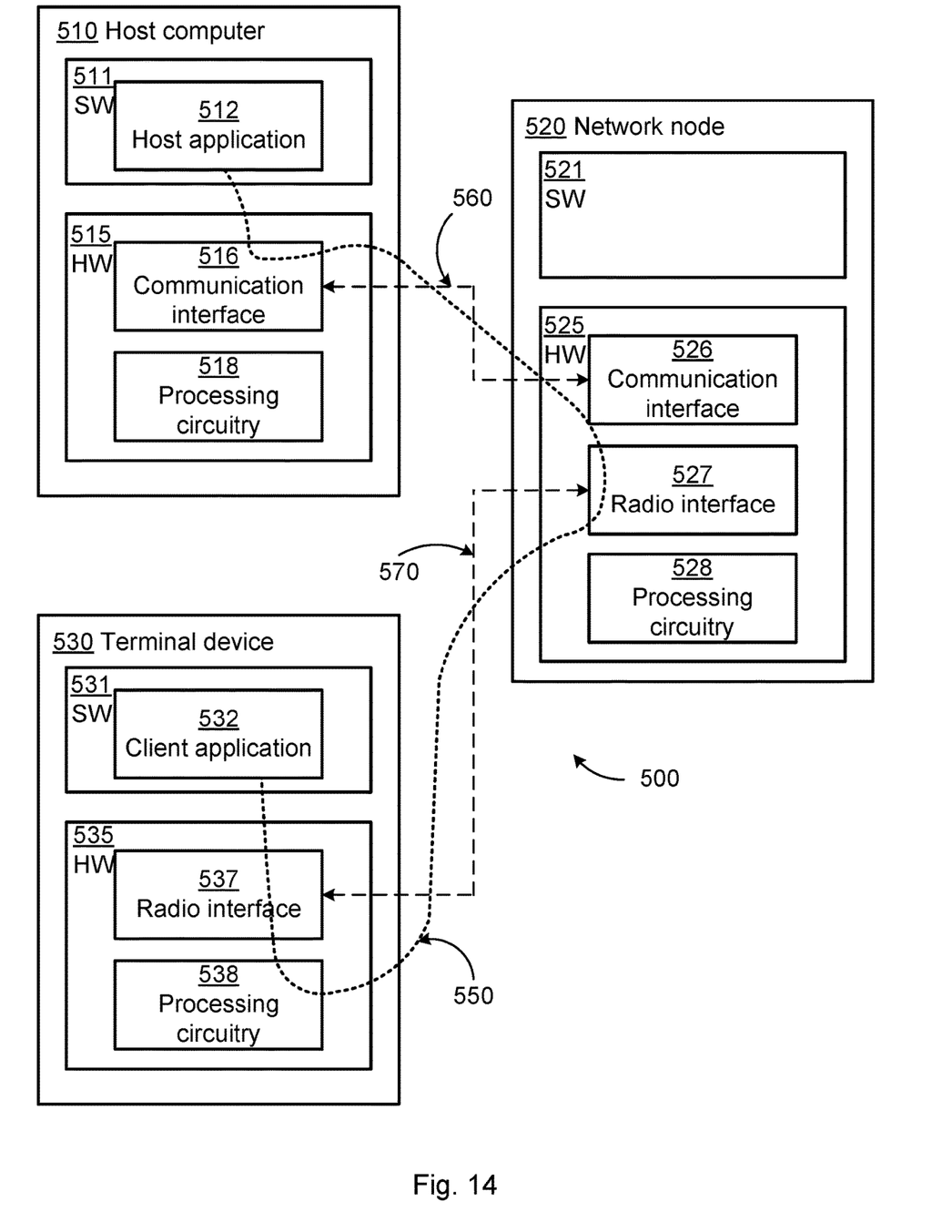
FIG. 14 is a schematic diagram illustrating host computer communicating via a radio base station with a terminal device over a partially wireless connection in accordance with some embodiments.

FIG. 14 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 14. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal device 300 of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 200 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 14) served by radio access network node 520. Communication interface 5≠may be configured to facilitate connection 560 to host computer 510. Connection 560 may be direct or it may pass through a core network (not shown in FIG. 14) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 14 may be similar or identical to host computer 430, one of network nodes 412a, 412b, 412c and one of UEs 491, 492 of FIG. 13, respectively. This is to say, the inner workings of these entities may be as shown in FIG. 14 and independently, the surrounding network topology may be that of FIG. 13.

In FIG. 14, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for performing a beam management procedure, the method being performed by a network node, the method comprising:
   obtaining configuration information from a terminal device for which the network node provides network access, wherein the configuration information specifies that the terminal device is in need for evaluating different polarization states in different time units during the beam management procedure; and
   performing the beam management procedure with the terminal device, wherein the beam management procedure involves the network node to, per slot, transmit reference signals according to a reference signal transmission scheme, and wherein the reference signal transmission scheme depends on the obtained configuration information.

2. The method according to claim 1, wherein each of the different time units corresponds to a respective orthogonal frequency division multiplexing, OFDM, symbol, and wherein the reference signal transmission scheme defines at which OFDM symbols per slot that the reference signals are to be transmitted.

3. The method according to claim 1, wherein, according to the beam management procedure, the reference signals are to be transmitted in beams, and wherein, according to the reference signal transmission scheme, each reference signal is to be transmitted twice in each beam per slot.

4. The method according to claim 1, wherein the terminal device is equipped with an antenna array having dual-polarized antenna elements and wherein the configuration information further specifies that the terminal device is configured to generate N>1 beams per polarization of the antenna elements.

5. The method according to claim 4, wherein, according to the reference signal transmission scheme, either fewer reference signals than 2·N are to be transmitted per slot, or exactly N+2 reference signals are to be transmitted per slot.

6. The method according to claim 4, wherein, according to the reference signal transmission scheme, either two of the reference signals are in the slot separated by at least one orthogonal frequency division multiplexing, OFDM, symbol from the remaining N reference signals, and wherein said two of the reference signals are to be transmitted before said remaining N reference signals, or two of the reference signals are placed to be transmitted as early as possible in the slot, and wherein said remaining N reference signals are placed to be transmitted as late as possible in the slot.

7. The method according to claim 4, wherein all the reference signals per slot are to be transmitted using one and the same beam.

8. A method for performing a beam management procedure, the method being performed by a terminal device, the method comprising:
   providing configuration information to a network node that provides network access to the terminal device, wherein the configuration information specifies that the terminal device is in need for evaluating different polarization states in different time units during the beam management procedure; and
   performing the beam management procedure with the network node, wherein the beam management procedure involves the terminal device to, per slot, receive reference signals from the network node according to a reference signal reception scheme, and wherein the reference signal reception scheme depends on the provided configuration information.

9. The method according to claim 8, wherein each of the different time units corresponds to a respective orthogonal frequency division multiplexing, OFDM, symbol, and wherein the reference signal reception scheme defines at which OFDM symbols per slot that the reference signals are to be received.

10. The method according to claim 8, wherein, when performing the beam management procedure, half of the reference signals are received using a first polarization whereas the remaining half of the reference signals are received using a second polarization.

11. The method according to claim 10, wherein, according to the beam management procedure, the reference signals are to be transmitted in beams, and wherein, according to the reference signal reception scheme, each reference signal per beam is per slot to be received once using the first polarization and once using the second polarization.

12. The method according to claim 8, wherein the terminal device is equipped with an antenna array having dual-polarized antenna elements and wherein the configuration information further specifies that the terminal device is configured to generate $N \geq 1$ beams per polarization of the antenna elements.

13. The method according to claim 12, wherein, according to the reference signal reception scheme, fewer reference signals than 2·N are to be received per slot.

14. The method according to claim 12, wherein, according to the reference signal reception scheme, exactly N+2 reference signals are to be received per slot.

15. The method according to claim 12, wherein, according to the reference signal reception scheme, two of the reference signals are in the slot separated by at least one orthogonal frequency division multiplexing, OFDM, symbol from the remaining N reference signals, and wherein said two of the reference signals are to be received before said remaining N reference signals.

16. The method according to claim 12, wherein, according to the reference signal reception scheme, two of the reference signals are placed to be received as early as possible in the slot, and wherein said remaining N reference signals are placed to be received as late as possible in the slot.

17. The method according to claim 15, wherein, when performing the beam management procedure, reference signal received power, RSRP, of a first of said two of the reference signals as received using a first polarization is compared to RSRP of a second of said two of the reference signals as received using a second polarization, and wherein said remaining N reference signals are received using the first polarization if that polarization yielded the highest RSRP or using the second polarization if that polarization yielded the highest RSRP.

18. The method according to claim 8, wherein the terminal device is equipped with an antenna array having dual-polarized antenna elements, and wherein the antenna array is connected to a baseband chain in the terminal device.

19. A network node for performing a beam management procedure, the network node comprising processing circuitry, the processing circuitry being configured to cause the network node to:
   obtain configuration information from a terminal device for which the network node provides network access, wherein the configuration information specifies that the terminal device is in need for evaluating different polarization states in different time units during the beam management procedure; and perform the beam management procedure with the terminal device, wherein the beam management procedure involves the network node to, per slot, transmit reference signals according to a reference signal transmission scheme, and wherein the reference signal transmission scheme depends on the obtained configuration information.

20. A terminal device for performing a beam management procedure, the terminal device comprising processing circuitry, the processing circuitry being configured to cause the terminal device to:

provide configuration information to a network node that provides network access to the terminal device, wherein the configuration information specifies that the terminal device is in need for evaluating different polarization states in different time units during the beam management procedure; and perform the beam management procedure with the network node, wherein the beam management procedure involves the terminal device to, per slot, receive reference signals from the network node according to a reference signal reception scheme, and wherein the reference signal reception scheme depends on the provided configuration information.

21. A computer program product for performing a beam management procedure, the computer program product comprising a non-transitory computer readable medium storing computer code which, when run on processing circuitry of a network node, causes the network node to:

obtain configuration information from a terminal device for which the network node provides network access, wherein the configuration information specifies that the terminal device is in need for evaluating different polarization states in different time units during the beam management procedure; and perform the beam management procedure with the terminal device, wherein the beam management procedure involves the network node to, per slot, transmit reference signals according to a reference signal transmission scheme, and wherein the reference signal transmission scheme depends on the obtained configuration information.

22. A computer program product for performing a beam management procedure, the computer program product comprising a non-transitory computer readable medium storing computer code which, when run on processing circuitry of a terminal device, causes the terminal device to:

provide configuration information to a network node that provides network access to the terminal device, wherein the configuration information specifies that the terminal device is in need for evaluating different polarization states in different time units during the beam management procedure; and perform the beam management procedure with the network node, wherein the beam management procedure involves the terminal device to, per slot, receive reference signals from the network node according to a reference signal reception scheme, and wherein the reference signal reception scheme depends on the provided configuration information.

* * * * *